US012636605B2

(12) United States Patent
Fisher

(10) Patent No.: US 12,636,605 B2
(45) Date of Patent: May 26, 2026

(54) INDUSTRIAL AIR POLLUTION REMOVAL SYSTEM

(71) Applicant: Cheryl Lynn Fisher, Lake, MI (US)

(72) Inventor: Cheryl Lynn Fisher, Lake, MI (US)

( * ) Notice: Subject to any disclaimer, the term of this patent is extended or adjusted under 35 U.S.C. 154(b) by 537 days.

(21) Appl. No.: 18/339,554

(22) Filed: Jun. 22, 2023

(65) Prior Publication Data

US 2023/0415086 A1 Dec. 28, 2023

Related U.S. Application Data

(60) Provisional application No. 63/354,847, filed on Jun. 23, 2022.

(51) Int. Cl.
| | |
|---|---|
| *B01D 53/00* | (2006.01) |
| *B01D 3/14* | (2006.01) |
| *B01D 7/00* | (2006.01) |
| *B01D 53/14* | (2006.01) |

(52) U.S. Cl.
CPC .......... *B01D 53/005* (2013.01); *B01D 3/143* (2013.01); *B01D 7/00* (2013.01); *B01D 53/002* (2013.01); *B01D 53/1493* (2013.01); *B01D 2252/103* (2013.01); *B01D 2257/504* (2013.01); *B01D 2257/602* (2013.01); *B01D 2257/706* (2013.01); *B01D 2257/708* (2013.01)

(58) Field of Classification Search
None
See application file for complete search history.

(56) References Cited

U.S. PATENT DOCUMENTS

2011/0311423 A1* 12/2011 Clarke .................. B01J 23/464
422/108

FOREIGN PATENT DOCUMENTS

| | | | | |
|---|---|---|---|---|
| CN | 112495135 A | * | 3/2021 | ............. B01D 53/04 |
| DE | 19940371 A1 | * | 3/2001 | ............. C01B 32/50 |
| KR | 20190122391 A | * | 10/2019 | ......... F28D 21/0003 |
| WO | WO-2012161711 A1 | * | 11/2012 | ............. B01D 53/78 |

OTHER PUBLICATIONS

English translation of CN-112495135-A Description. (Year: 2021).*
English translation of KR-20190122391-A Description. (Year: 2019).*
English translation of DE-19940371-A1 Description. (Year: 2001).*

* cited by examiner

*Primary Examiner* — Anthony J Zimmer
*Assistant Examiner* — Zachary John Baum

(57) ABSTRACT

An industrial air pollution removal system that eliminates unwanted gases from the environment includes a four-step process. The first step is an investigatory process to gather all the properties of the stack as flow rate, gas types, and hottest point of the stack. A second step captures either through water in the vat phase or sublimation of carbon dioxide and mercury into slabs of dry ice. In the byproducts, internal uses can be found to defray costs. A third step is the transportation of vat phase by truck and dry ice in refrigerated truck. A fourth step is the fractionalization center will recycle the captured emissions, such as separation of particulate matter, distillation for the liquid, sublimation of the dry ice and mercury, and using a dry ice processing plant. The goal is the sale of recycled materials as raw materials, conserve natural resources, and to positively affect climate change.

18 Claims, 20 Drawing Sheets

INDUSTRIAL AIR POLLUTION REMOVAL SYSTEM

INTRODUCTION

The present disclosure relates to industrial air pollution removal, and more particularly, to a system and method that removes pollutants from an industrial emission prior to the industrial emission entering the environment.

The industrial air pollution removal system of the present disclosure eliminates and stops all industrial emissions into the environment. The air pollution removal system and method in the present disclosure mainstreams the way emissions are handled. Unfortunately, air pollution is the greatest problem affecting climate change.

Existing air pollution control systems such as electrostatic precipitators, air scrubbers, desulfurization chemicals are inadequate because they are releasing emissions with pollutants even after treating the emissions prior to release into the environment. Meanwhile, the pollutants themselves have chemicals which have commercial value and could be harvested. Energy in the form of heat could also be harvested from the emissions for commercial purposes to defray costs accrued. Therefore, there is a need in the art for an industrial air pollution removal system and method that includes on-site capture and transporting of the harvested emissions which are recycled at a fractionalization center and sold as raw materials. The air pollution removal system and method in the present disclosure positively affects climate change and conserves natural resources while opening new markets with recycled products.

SUMMARY

According to several aspects, an industrial air pollution removal system is provided. Sources of such industrial emission include, but are not limited to, coal driven electrical generation plants, oil refineries, and manufacturing facilities.

The industrial air pollution system is a universal system that can be used at any emissions producing plant. The industrial air pollution system includes a capturing phase for the emissions with unknown chemicals and gases, a fact-finding phase that determines the chemical constituents of the emissions with unknown chemicals and gases, secondary burning phase to eliminate any volatile organic chemicals and semi-volatile organic chemicals in the emissions from the fact-finding phase. The emissions from the secondary burning phase are fed into the vat phase, where water soluble chemicals and gases in the emissions are captured, and particulates are deposited. The emissions are reduced to steam, carbon dioxide, and mercury if present.

In another aspect of the present disclosure, the industrial air pollution system's vat phase includes a first vat tank with a first chemical sensor and a pressure sensor and a second vat tank with second chemical sensor as well as a pressure sensor. The first chemical sensor monitors the concentration of the chemicals in the first vat tank, and the second sensor monitors the concentration of the chemicals in the second vat tank. Emissions from the secondary burning phase are fed into the first vat tank until a predetermined chemical concentration threshold is reached. The first chemical sensor sends a signal that causes the emissions to be fed to the second vat tank. The pressure sensors function as a safety measure to avoid overpressure incidents.

In another aspect of the present disclosure, the industrial air pollution removal system's vat phase produces steam, which may be used in generating electricity and/or heating and cooling if mercury is not present in the emissions. Both the electrical generation, and the heating and cooling system include a tank to capture the water after the undergoes condensation.

In another aspect of the present disclosure, the industrial pollution removal system has a freeze pod phase for the water insoluble gases of the emissions from the vat phase, and one refrigerated truck or a plurality of refrigerated trucks to transport the deposits produced in the freeze pod phase.

In another aspect of the present disclosure, the industrial pollution removal system has one tanker truck or a plurality of tanker trucks to transport the water and particulate deposits from the vat tank.

In another aspect of the present disclosure, the industrial pollution removal system has fractionalization step.

BRIEF DESCRIPTION OF THE DRAWINGS

The drawings described herein are for illustrative purposes only and are not intended to limit the scope of the present disclosure in any way.

DETAILED DESCRIPTION

The following description is merely exemplary in nature and is not intended to limit the present disclosure, application, or uses.

Figure 1:
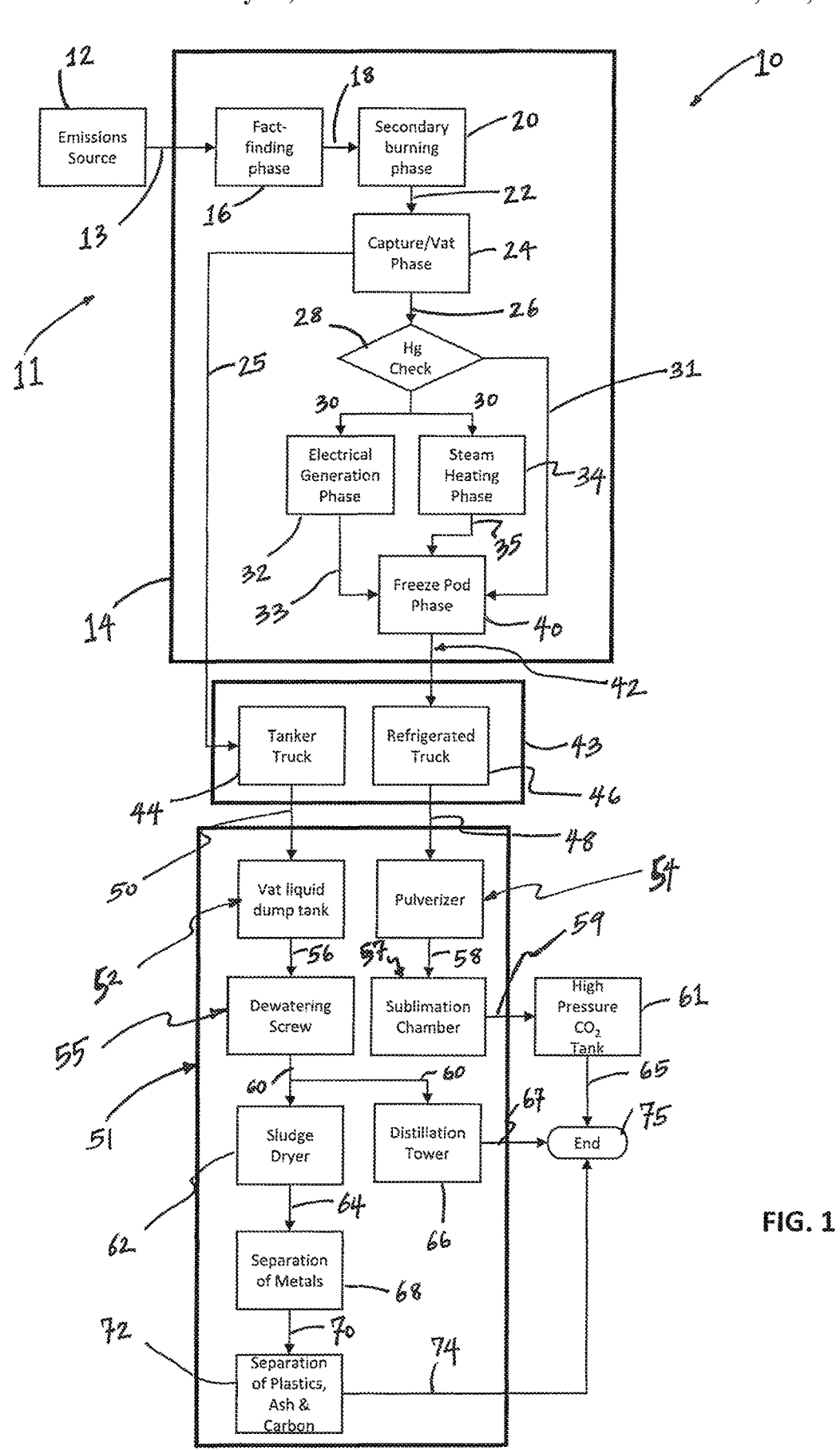
FIG. 1 is a flow diagram illustrating an industrial air pollution removal schematic illustrating processing of emissions from source to raw materials.

Referring to FIG. 1, an industrial pollution removal system is shown and generally indicated by reference number 10. The industrial pollution system 10 exists in an environment 11 and is connected to an emissions source 12. When emissions 13 from the emissions source 12 is released, the emissions 13 are captured in a first step 14. This first step 14 processes the emissions 13 in six different phases. The first phase is a fact-finding phase 16, the second phase is a secondary burning phase 20, the third phase is a capture/vat phase 24. The fourth phase is an electric generation phase 32, and the fifth phase is a steam heating phase 34. The electrical generation phases 32 and the steam heating phase 34 are optional phases that are dependent on whether mercury is present in the emissions 13, or whether the plant or emissions source 12 is retrofitted to either generate electricity or heat and cool the with steam. The last phase is a freeze pod phase 40. At the freeze pod phase 40 content from the capture/vat phase 24, the electrical generation phase 32, and the steam heating phase 34 are frozen for further processing.

A molecular composition of emissions 13 is determined in the fact-finding phase 16. The emissions with known molecular composition 18 may contain dioxides, monoxides, organometallic compounds, volatile organic compounds (VOC's), and semi-volatile organic compounds (SVOC's). The emissions with known molecular composition 18 may also contain mercury. At the fact-finding phase 16, a starting temperature of a secondary burning by locating a hottest point in the emissions 13. The location of the hottest point also provides an exact location for splicing. The emissions with known molecular composition 18 are then fed to the secondary burning phase 20, which combusts the dioxides, monoxides, organometallic compounds, the VOC's and the SVOC's. The emissions from the secondary burning phase 22 are then fed to the next phase capture/vat phase 24. At the capture/vat phase 24, the water-soluble contents in the emissions from the secondary burning chamber 22 are captured in water creating the vat liquid 25. The vat liquid 25 also contains particulates originally in the emissions 13, and particulate that are created during combustion in the secondary burning phase 22. Capturing the water-soluble contents in the emissions from the secondary burning chamber 22 creates steam due to the heat absorbed by the emissions from the burning chamber 22 during the secondary burning phase 20. This steam may be used to generate electricity in the electricity generation phase 32, or heating in the steam heating phase 34. The steam and the water-insoluble contents form gaseous content 26 of the emissions from the burning chamber 22. The water-insoluble contents include carbon dioxide and may include mercury, which is checked for at the fact-finding phase 16 and is highlighted by checkpoint 28. The gaseous content without mercury 30 is fed to electrical generation phase 32 and the steam heating cooling phase 34 before the remnant of the electrical generation phase 33, and the remnant of the steam heating phase 35 are sent to be frozen in the freeze pod phase 40. The gaseous content with mercury 31 is unusable and thus is sent directly to the freeze pod phase 40.

The vat liquid 25 and the frozen contents 42 undergo more processing. The process may be performed in a different processing plant that is in a different location from the emissions source 12. The vat liquid 25 may be transported in a transportation step 43 to the processing plant in a tanker truck 44, whereas the frozen contents 42 may be transported in a transportation step 43 to the processing plant in a refrigerated truck 46. It should be appreciated that other types of transportation, such as trains or boats, may be employed without departing from the scope of the present disclosure.

The fractionalization step 51 may be performed at the processing plant that receives the tanker truck 44 and refrigerated truck 46. The vat liquid 25 may be transported to the processing plant in one or a plurality of tanker trucks 44, and the frozen content 42 is transported to the processing plant in one or a plurality of refrigerated trucks 46.

The vat liquid 25 and the frozen contents 42 undergo different processes during the fractionalization step 51. The vat liquid 25 is first deposited into a vat liquid dump tank 220 (see FIG. 8A) which acts as a reservoir from the dewatering screw 230 (see FIG. 9). These two apparatuses are responsible for the dumping process 52 and dewatering process 55, respectively. The dewatering screw 220 (see FIG. 9) separates the liquid and particulates that make up the vat liquid 25. Most of the liquid from the vat liquid 25 is fed to distillation tower for the distillation phase 66 for further separation. The remainder of the liquid and particulates combine to create sludge that is fed into the sludge dryer 250 (see FIG. 10A) for the drying process 62. The drying process 62 reduces the sludge to just the particulates 64 that consists of ferrous metals, non-ferrous metals, plastics, carbon, and ash.

The ferrous metals and the non-ferrous metals are collected in the separation of metals process 68 and the ash, carbon, and plastics 70 are collected in the separation of plastics, ash and carbon process 72.

The frozen contents 42 undergoes, first, a pulverization process 54 that converts the frozen water-insoluble contents into gases, carbon dioxide gas and mercury gas. The carbon dioxide gas and mercury gas then undergo a sublimation process 57, which converts them back into two separate solids. The carbon dioxide is the stored in a high-pressure carbon dioxide tank (not shown) in storage process 61.

Figure 2:
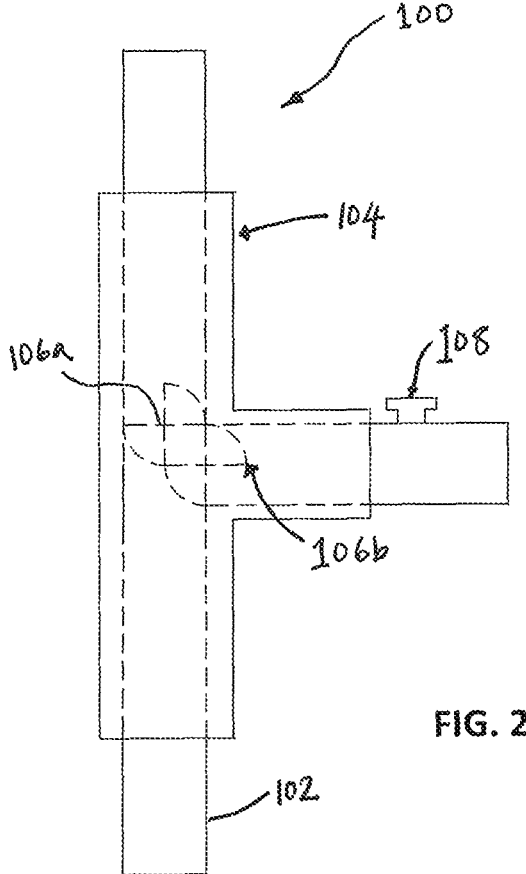
FIG. 2 is a side schematic view of an emissions stack to secondary burning chamber connector used in a fact-finding and a splicing phase.

Referring to FIG. 2, an apparatus 100 used in the fact-finding phase 16 is shown. The apparatus 100 includes an emissions stack 102, an outer housing 104, a plurality of emergency butterfly hatches 106*a*, 106*b*, and exhaust motor 108. Outer housing 104 is sized to support the emissions stack 102, which must be intact in case of an emergency process failure. The butterfly hatches 106*a*, 106*b* used to control emissions flow in the emissions stack 102. Butterfly hatch 106*a* is opened during emergency process failures allowing the emissions stack 102 to operate as though a splice were not installed, whereas butterfly hatch 106*b* sends emissions 13 to a secondary burning chamber 110 (see FIG. 3), when opened. Only one butterfly hatch can be opened at any given time. Exemplary materials like hardened steel may be used to build the emissions stack 102 since it can keep its structural integrity at high temperatures. The exhaust motor 108 is located at the exit connecting the emissions stack 102 and the secondary burning chamber 110. The exhaust motor 108 acts as a vacuum that draws out emissions 14 from the emissions stack 102 to the secondary burning chamber 110, preventing gaseous molecules in the emissions 13 from permanently bonding together. The exit may be built from refractory metals such Niobium, Molybdenum, Tantalum, Tungsten, or Rhenium. Emissions 13 may also contain particulate matter. The fact-finding phase 16 also predicts how much particulate matter will be produced. The fact-find phase 16 also predicts the molecules, in the emissions 13, that may bond to each other, survive the secondary burning chamber 110, or may be broken down through hydrolysis in the vat phase 24.

Figure 3:
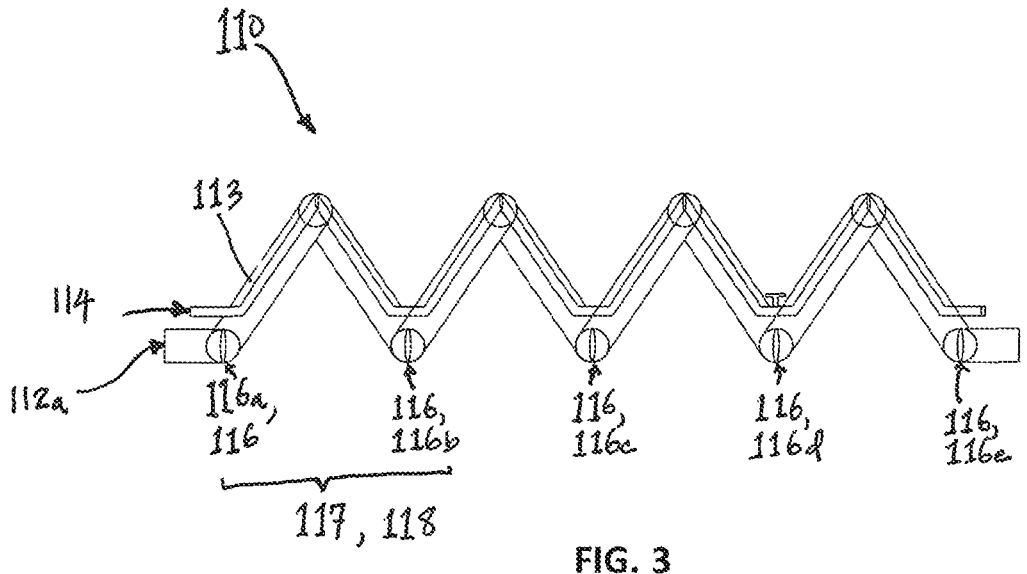
FIG. 3 is a cross-sectional schematic view of the secondary burning chamber.

Referring to FIG. 3, the secondary burning chamber 110 used in the secondary burning phase 20 is shown. It comprises an inlet 112*a* that connects to emissions stack 102, an outlet 112*b*, a gas burner 113 to combust the fuel used to heat up the burning chamber 110, the gas burner has a gas inlet 114, a gas burner cap 115. The secondary burning chamber 110 also includes a plurality of exhaust doors 116. The plurality of exhaust doors 116 divide the secondary burning chamber 110 into a plurality of sections 117 whose temperatures vary by 100 degrees Fahrenheit interval 118 (not shown). The emissions 13 travels from the emissions stack 102 at a starting temperature that is lower than the temperature of the first section 117 in the burning chamber 110. The first section is between the first exhaust door 116*a* and the second exhaust door 116*b*. The emissions 13 from the emissions stack 102 (see FIG. 2) is sealed in the first section 177 of the burning chamber 110 until the emissions 13 temperature is equal to the first section's temperature, at which time the first exhaust door 116 opens to release the emissions 13 to the second chamber. This process is repeated at each section of the secondary burning chamber 110 until a final temperature of 2000 degrees Fahrenheit is achieved to ensure complete combustion of dioxides, monoxides, VOC's, SVOC's, dioxanes, organometallic compounds, and any combustion byproducts such as creosol, which is produced in the burning of wood. The secondary burning chamber also includes a venturi tee shaped mixing valve 119 that is used to control the amount of oxygen available to the gas burner 113. Emissions from the secondary phase 22 exit the secondary burning chamber through the outlet 112*b* to go the vat tank 122. The secondary burning chamber 110 has a spiral shape design and is built using refractory metals such Niobium, Molybdenum, Tantalum, Tungsten, or Rhenium. The secondary burning chamber's 110 spiral shape will increase turbulence in the emissions 13 and increase the amount of time emissions 13 resides in any given section of the combustion chamber 110, ensuring all dioxanes, organometallic compounds, monoxides, dioxides, VOC's and SVOC's with flashpoint temperatures between any given section's temperature threshold is completely combusted before moving to the next section of the combustion chamber 110. The exhaust doors 116 are located at the base of each spiral and is made up of refractory metals. All exhaust doors 116 form a metal-to-metal seal with a plurality of flat rings with electromagnetic mechanisms. The electromagnetic mechanism is turned off and opens the exhaust door when the section reaches a desired temperature, allowing the emissions to flow in the next section. The gas burner 113 uses Liquid Petroleum Gas (LPG) to heat up the chambers and the venturi tee shaped air mixing valve 119 is calibrated such that there's a proper amount of air in pounds per square inch (psi) and enough LPG to attain the 100-degree intervals 118 required between sections. The venturi tee shaped air mixing valve 119 is made of refractory metals.

Figures 4A, 4B, 4C, 4D:
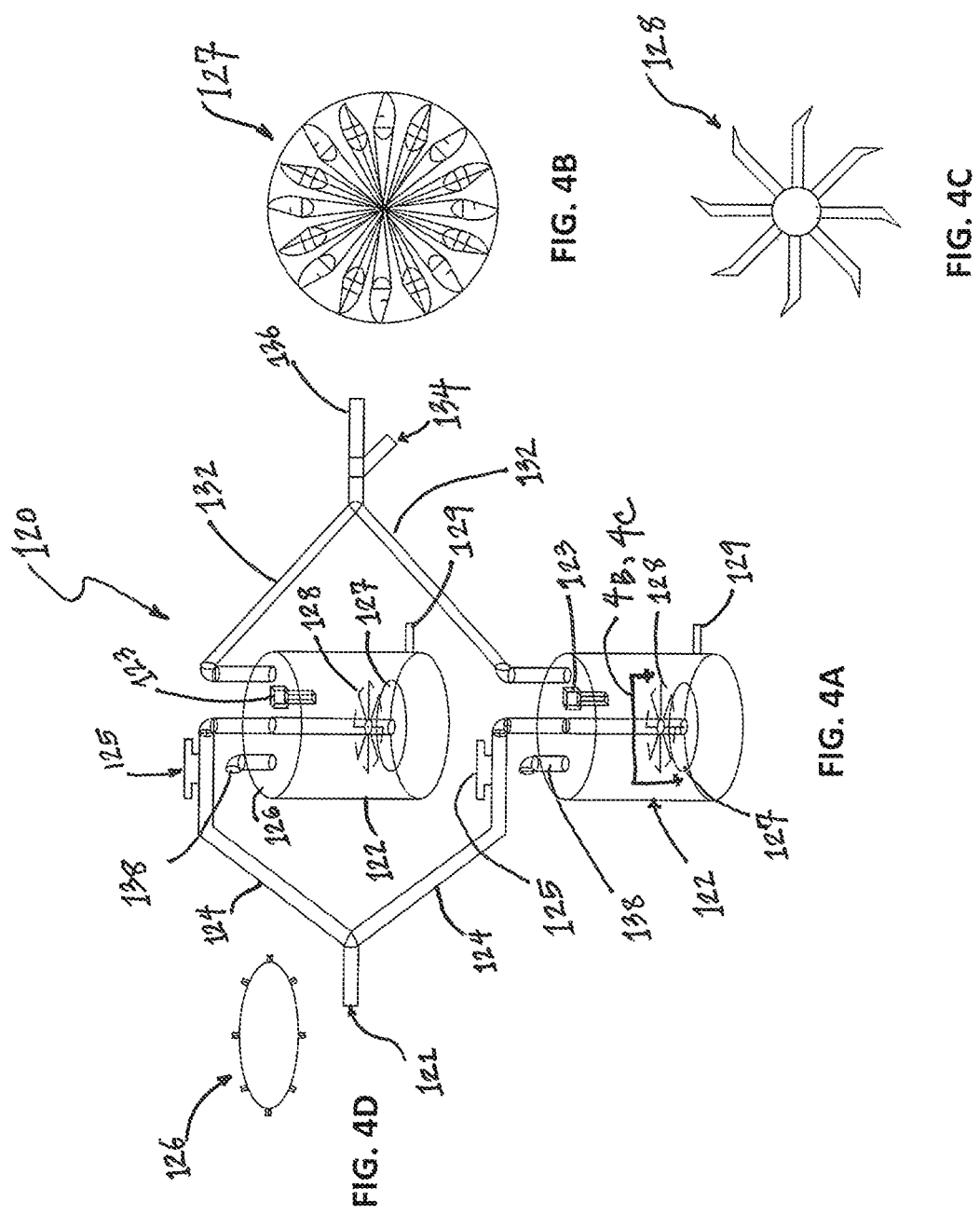
FIG. 4A is a side schematic view of the vat/capture phase system.
FIG. 4B is an enlarged top schematic view of the pinwheel blower nozzles.
FIG. 4C is an enlarged top schematic view of the pinwheel manifold.
FIG. 4D is an enlarged top schematic view of the tie down tabs.

FIG. 4A shows the entire vat/capture phase apparatus 120. vat/capture apparatus is fed the emissions 32 without dioxides, monoxides, dioxanes, organometallic compounds, VOC's and SVOC's from the secondary burning chamber 110 through inlet 121 that connects to the secondary chamber's 110 outlet 112*b*. The vat/capture phase apparatus may contain a plurality of the vat tanks 122. A vat tank 122 includes a chemical concentration sensor 123*a*, a pressure sensor 123*b*, emissions feeding tube 124 that has a blower motor 125, tied down tabs 126, a pinwheel manifold 127, a pinwheel blower nozzle 128, a drain 129, and outlet pipe for the gaseous content 26. The water-insoluble contents flow out outlet 134 to the freezing pod phase 40, and the steam flows out outlet 136 for use in either the electrical generation phase 32, the steam heating phase 34 or both. The use of steam is dependent on whether the plant or emissions source 12 has the required capability to utilize the steam and whether the steam is contaminated with mercury. The vat tank also includes a pressure sensor 138 and an emergency pop off valve at the same location as the pressure sensor 138, which is contingency to prevent the vat tank from exploding due to high internal pressures.

FIG. 4B. is the enlarged top view of the pinwheel manifold 127. The pinwheel manifold 127 is submerged in the water in the vat tank 122, next to the floor of the vat tank 122. It is connected to the exit end of the feed tube 124 and rotates circularly to ensure a homogenous mixing of the water-soluble contents in the emissions 13 that spew out of the plurality of pinwheel blower nozzles 128, which the enlarged top view is shown in FIG. 4C. The plurality of blower nozzles 128 need to be large enough to prevent blockages and easy passage of particulates in emissions 13. The blower motor 125 ensures the steady flow of emissions 13 into the vat tank 122 and the ensures that the water in the vat tank 122 does not travel through the blower nozzle and up the emissions feeding tube 124. FIG. 4D. is the enlarged top view of the plurality of tie down tabs 126 that allow for the threading in of bolts and nuts that act as fasteners of the vat tank's 122 top cover The use of bolt and nuts as fasteners is to facilitate ease of routine maintenance and repair to the vat tank 122. Feeding the emissions 32 to the vat tank 122 through a submerged feeding tube 124 was done to prevent heat from evaporating the water in vat tank producing steam and increasing the pressure to dangerous levels causing an explosion.

The chemical concentration of the gases vat tank 122 is monitored using the chemical sensor 123 that ensures that the chemical concentration of the gases in the vat tank 122 is under a prescribed chemical concentration. The chemical sensor 123 is made from ceramic materials and will measure density and concentrations of pollutant gases that may contaminate carbon dioxide, mercury and steam. The present disclosure allows for multiple vat tanks and controllable emissions flows, which may stop flow of emissions 13 from a first vat tank 122 and divert the flow of emissions 13 to a second identical vat tank 122 when the prescribed chemical concentration threshold has been reached in the first vat tank 122. The pressure of the vat tank is also monitored by the pressure sensor 138 to ensure the vat tank 122 does not explode due to high pressure.

When mercury is absent from emissions 13, the steam produced in the vat tank 122 during the vat phase 16 may be utilized in several processes. Two exemplary processes outlined in the present disclosure are electric generation and heating and cooling. Any excess steam not used in the exemplary processes is moved from the vat tank 122 to the freeze pod 160 (see FIG. 7A) along with mercury and carbon dioxide.

Figure 5:
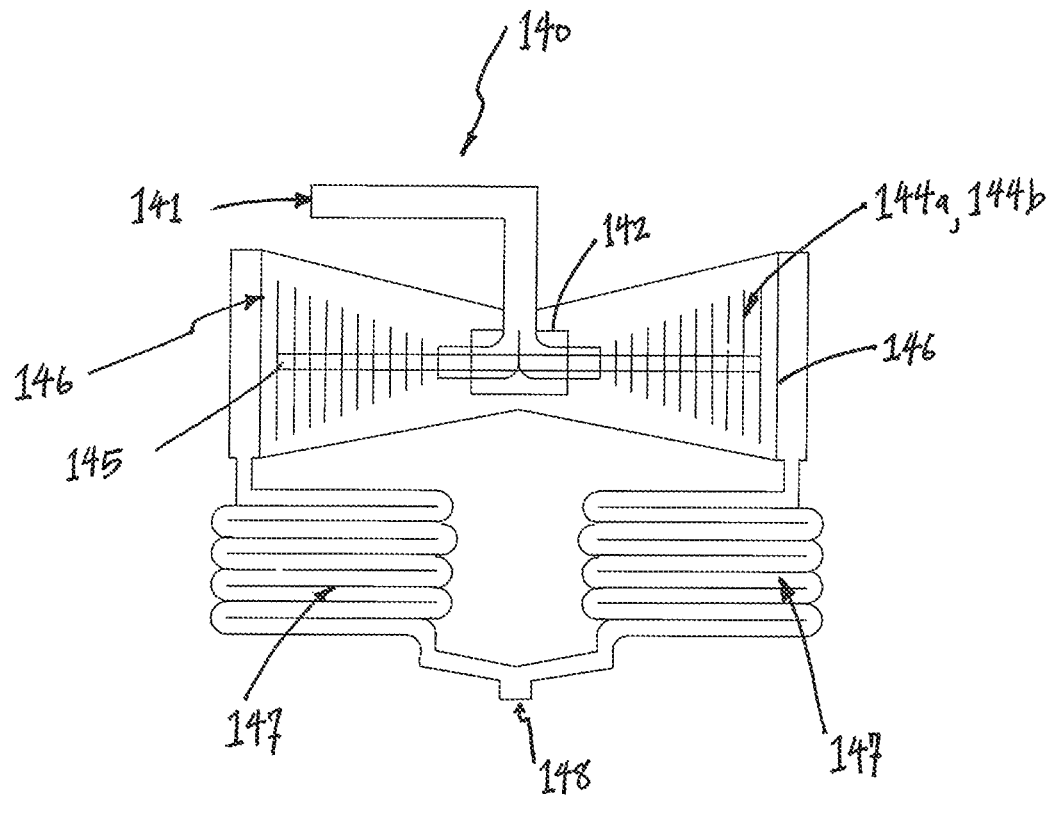
FIG. 5 is a side schematic view of an exemplary electrical generator that utilizes steam.

FIG. 5 is an exemplary illustration of an electric generator 140 that utilizes steam to produce electricity for the electrical generation phase 32. The electric generator 140 includes a steam inlet that 141 that is connected to vat system's outlet 136, a generation box 142, and impulse blade 144a and reaction blade 144b, a rotation shaft 145, a compressor 146, a condenser 147, and outlet 148 that connects the electric generator 140 to the freeze pod 160 (see FIG. 7A). The preferred configuration for electric generator 140 is a turbine configuration due to its advantageous property of preventing leakages. Electric generator 140 has an out encasement that seals in the steam and keeps it separate from the environment 11. The steam electrical generation design will follow de Laval's steam electrical generation design, which utilizes both an impulse blade 144a and a reaction blade 144b of the turbine system. The impulse blade takes advantage of the heat and velocity of the steam, and de Laval's system offers less jetting and allows for more stages to be used without losing steam velocity. Reaction blades can generate electricity at lower temperatures and lower pressures than impulse blades. Combining both a plurality of impulse blades 144a and plurality of reaction blades 144b in the electric generator 140 maximizes the utility of the steam fed into the electric generator 140 in producing electricity. The impulse blades 144a and the reaction blades 144b are made of nickel-based alloys such aluminum or titanium to improve strength and reduce the likelihood of creeping. The nickel-based alloys used to build the impulse blades 144a and the reaction blades 144b may also be mixed with refractory metals such as rhenium and ruthenium. The impulse blades 144a and the reaction blades 144b may also be coated with a stabilized zirconium dioxide-based ceramic or a similar coating material. Steam travels through to the compressors 146 that are placed on the either side of the plurality of impulse blades 144a and plurality of reaction blades 144b. The condensers 147 are also placed on either end of the electric generator and the condensers 147 receive the condensed steam from the compressors 146. The condensers 147 act as sinks that force the exhausted steam out of the turbine area. The compressed steam then travels from the condensers 147 through the outlet 148 to the freeze pod 160.

Figure 6:
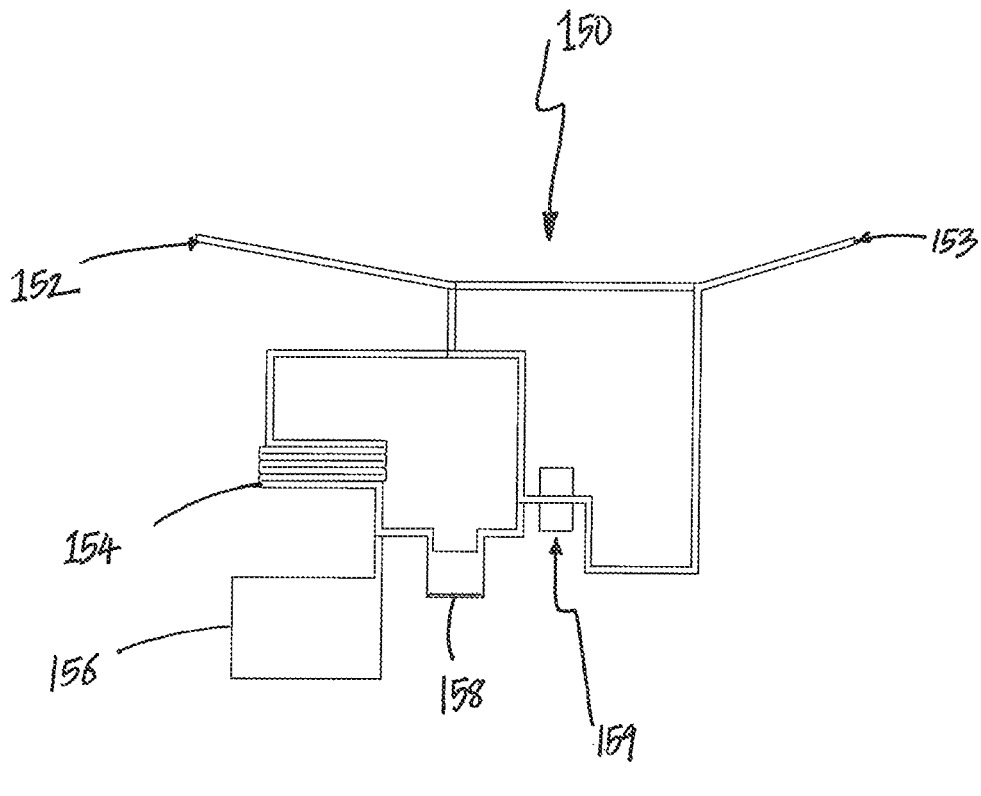
FIG. 6 is a side schematic view of an exemplary steam heating and cooling system.

FIG. 6 is an exemplary illustration of a steam heating and cooling system 150 that utilizes steam for the steam heating phase 34. The steam heating system 150 comprises of a steam inlet 152 which connects to the vat system's outlet 136 (see FIG. 4A), an outlet 153 that is connected to the freeze pod 160 (see FIG. 7A), a condenser 154, a make-up feed water supply 156, a boiler 158, and a compressor 159. Heating and cooling cycles are well described in the literature. Switching between heating and cooling can be accomplished by the inclusion of a reversing valve.

Figure 7A:
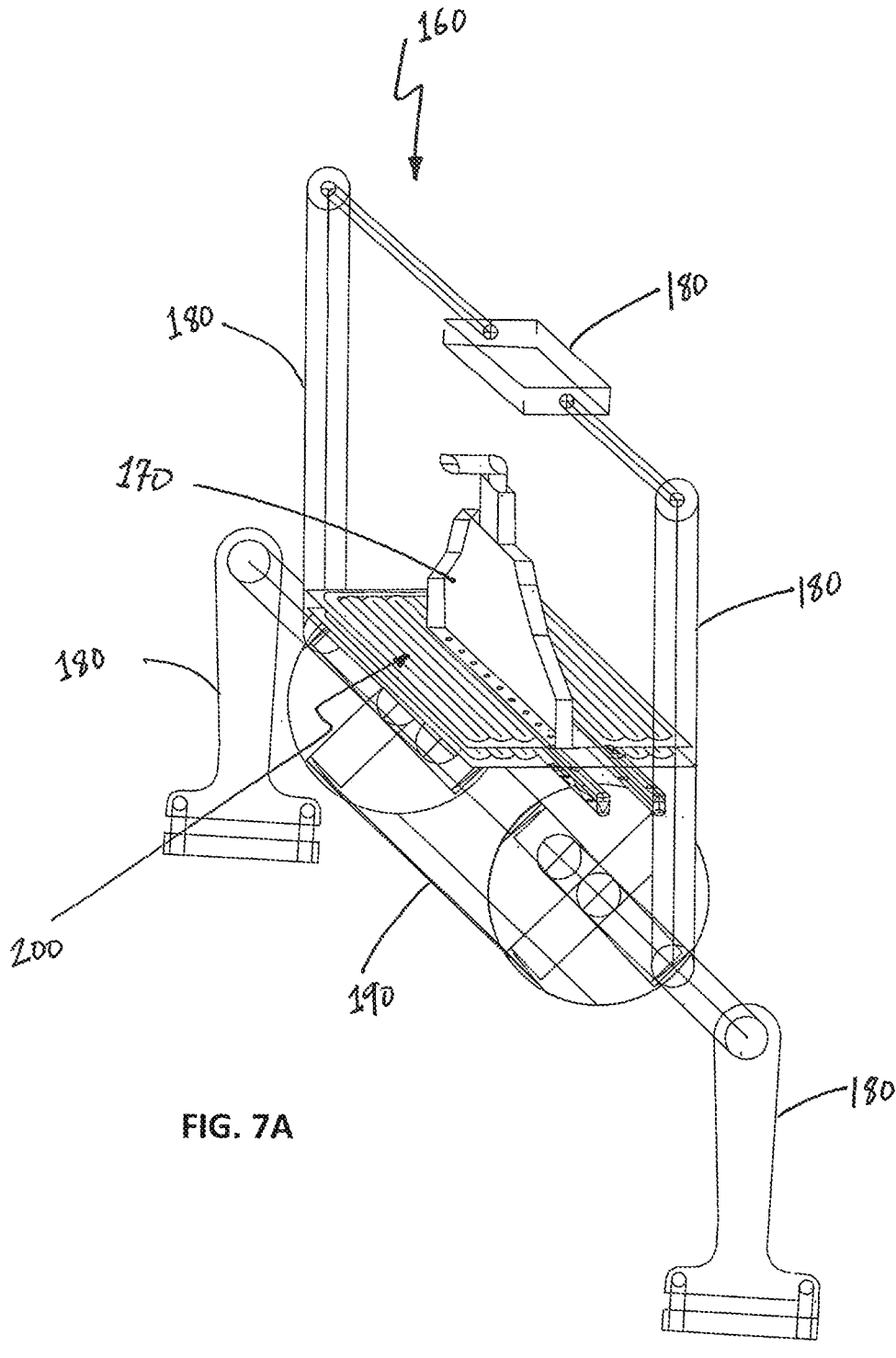
FIG. 7A is a perspective schematic view of a freeze pod composite.

FIG. 7A depicts the freeze pod composite system 160. The freeze pod composite 160 is comprised of four systems. The freeze pod distribution system 170, the freeze pod shaft system 180, the freeze pod scraping system 190, and the freeze pod refrigeration system 200. The primary purpose of the freeze pod composite system 160 is to sublimate carbon dioxide and convert it into dry ice. The freeze pod composite system 160 will also take any mercury that is present in the emissions 13 and solidify it along with the dry ice. The freeze pod is cylindrical, and its function placement is horizontal. The freeze pod composite system 160 is made up of four distinct subsystems and they are the freeze pod steam distribution system 170, the freeze pod shaft system 180, the freeze pod scraping system 190, the freeze pod refrigeration system 200.

Figure 7B:
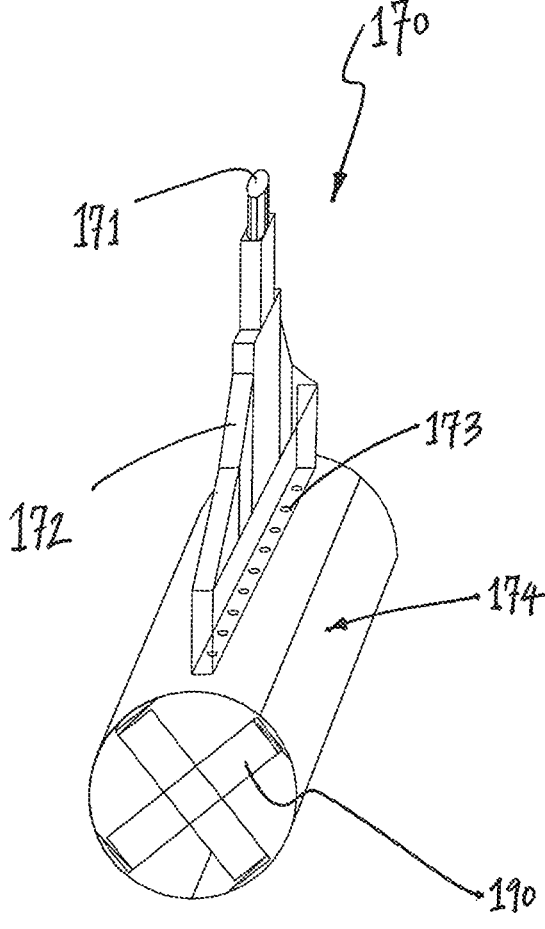
FIG. 7B is a perspective schematic view of a freeze pod steam distribution.

FIG. 7B shows the freeze pod steam distribution system 170 and it includes a steam inlet 171, a steam manifold 172, a plurality of steam outlet holes 173 that send the steam to the freeze pod 174. The freeze pod scraping system 190 is also shown contextually with the freeze pod distribution system 170. Sources of steam that feed the freeze pod composite system 160 (see FIG. 7A) are vat/capture phase that uses the vat system 120 (see FIG. 4A), steam use phases like the exemplary electric generation phase 32 that uses the electric generator 140, and the heating and cooling phase that uses the heating and cooling system 150 (see FIG. 6). Steam may travel from a plurality of sources through steam inlet 171. The size of pipe used to build the steam inlet 171 is selected to achieve high pressure at the steam inlet 171. The steam inlet 171 connected to the steam manifold 172, which fans out steam across into a plurality of steam outlet holes 173 that are evenly distributed all through the length of the cylindrical freeze pod 174. The plurality of steam outlet holes 173 are varied in size, with the smaller holes placed closer to the middle length of the freeze pod 174 and the bigger holes farther away from the middle length of the freeze pod 174. The varying size of the plurality of steam outlet holes 173 allows for a more even distribution of steam across the length of freeze pod 173. The freeze pod 174 encapsulates the freeze scraping system 190 whose primary task is to scrape off forming dry ice from the interior surface of the freeze pod 174.

Figure 7C:
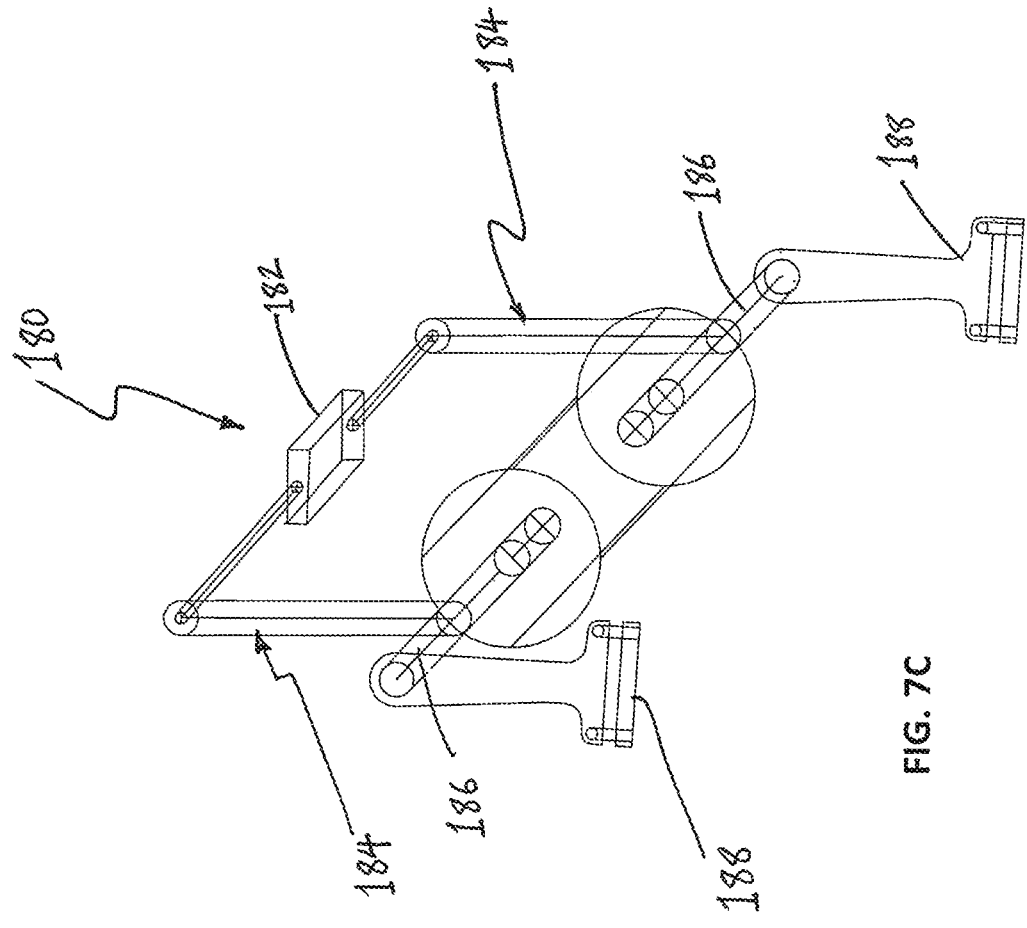
FIG. 7C is a perspective schematic view of a freeze pod shaft system.

FIG. 7C shows the freeze pod shaft system 180. The freeze pod shaft system is responsible for rotating the freeze pod scraping system 190 (see FIG. 7D) and includes a two-sided motor 182, a plurality of rotating belts 184, a plurality of rotating shafts 186 and a plurality of pillow block tension levelers 188. The two-side motor 182 connects to the plurality of rotating shafts 186 via the plurality of rotating belts 184. The plurality level blockers 188 act as ground support for the freeze pod system 160 (see FIG. 7A).

Figure 7D:
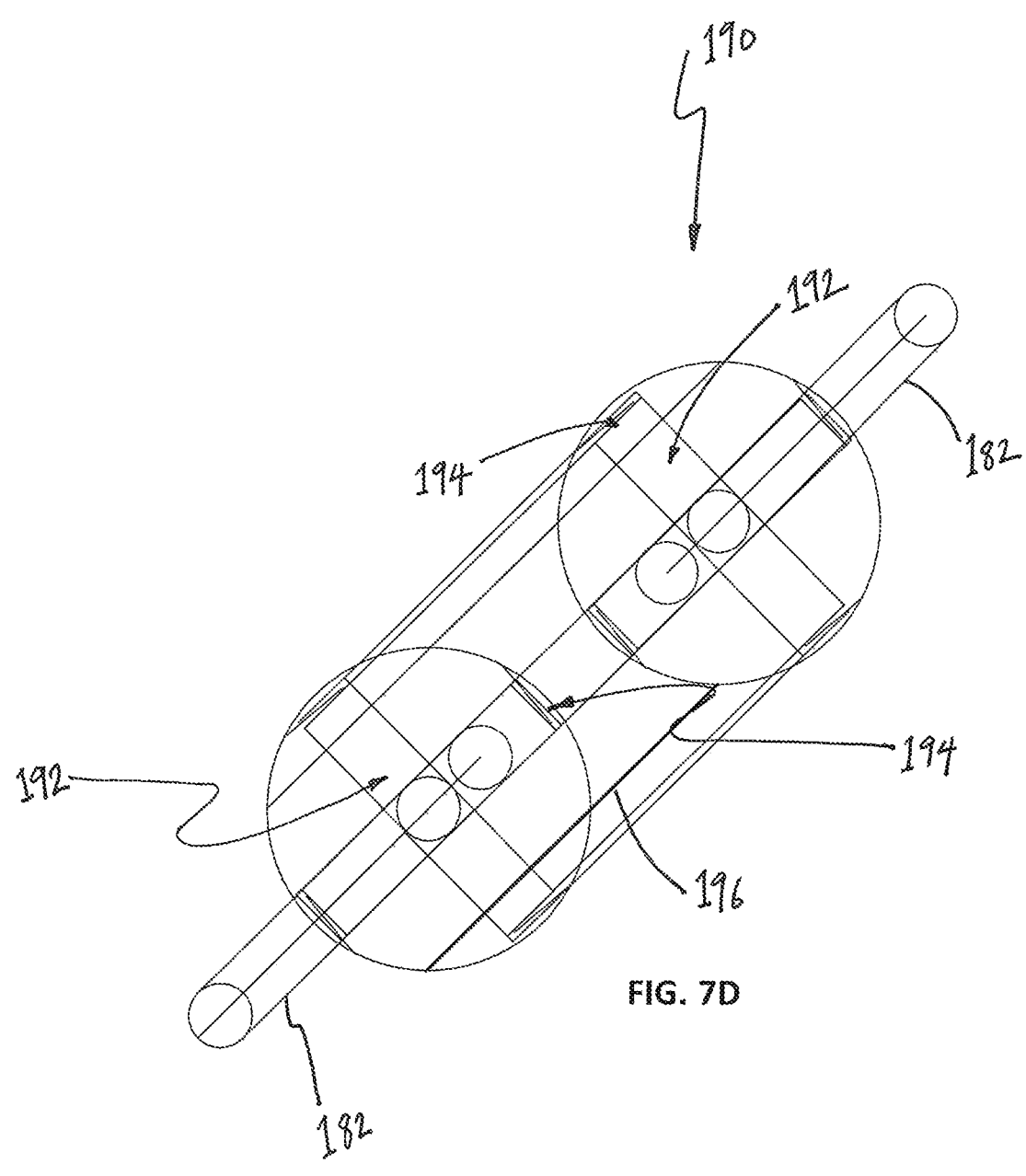
FIG. 7D is a perspective schematic view of a freeze pod scraper.

FIG. 7D shows the freeze pod scraping system 190 which comprises of a plurality of rotating devices 192 with scraping blades 194 at their radial extrema, and an ice shaving slit 196. The rotation of the freeze pods rotating device 192 is enabled by the plurality of shafts 186 that part of the freeze pod shaft system 180 (see FIG. 7C). The rotating devices 192 are responsible for moving the scraping blades 194 in circular motion and scraping off the dry ice that is forming in the interior surface of the freeze pod 174 (see FIG. 7B). The scraped dry ice falls through one of four ice shaving slits 196 into a dry ice mold 198 (not shown).

Figures 7E, 7F:
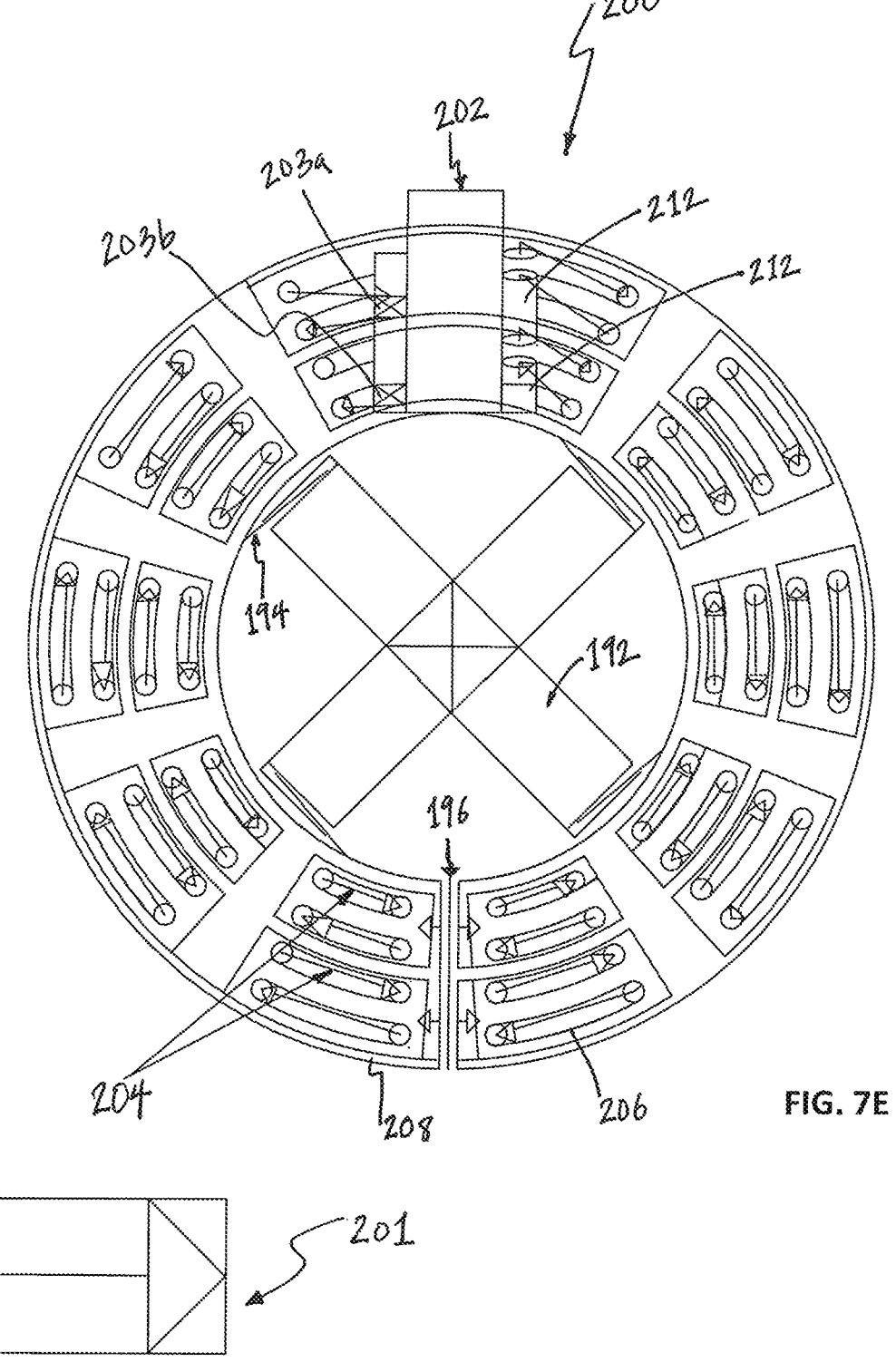
FIG. 7E depicts a cross sectional schematic view of a freeze pod refrigeration system.
FIG. 7F is an exemplary directional arrow that indicates refrigeration fluid flow in the freeze pod refrigeration system shown in FIG. 7E.

FIG. 7E is a cross-section of the freeze pod refrigeration system 200. The freeze pod refrigeration system 200 works through a two-stage cascade refrigeration system and includes an inlet 202 that connects to steam one the plurality of steam distribution outlet holes 173, a first TXV valve 203a, a second TXV valve 203b, a plurality of evaporative coils 204, a plurality of condenser coils 206, a heat exchanging plating area 208, and a compressor 212. The first TXV valve 203a and the second TXV valve 203b are metering devices that control the amount of high-pressure refrigerant entering the plurality of evaporative coils 204. The plurality of evaporative coils 204 take in the high-pressure refrigerant that travels through the plurality of evaporative coils 204, dispelling heat from the steam that is being fed into the freeze pod system 160, and thus effectively cooling steam to create dry ice. The high-pressure refrigerant exits the plurality of evaporative coils 204 as low-pressure refrigerant vapor, which is fed to the compressor 212. Compressor 212 compresses the low-pressure refrigerant vapor, increasing the refrigerants pressure and superheating the refrigerant. The superheated refrigerant is then fed into the plurality of condenser coils 206 as a high-pressure vapor. At the condenser coils the high-pressure refrigerants vapor is saturated into a high-pressure liquid. The heat exchange plates facilitate more efficient heat exchange of the $CO_2$ than through heat transmission through the air. The refrigerant flows in through the evaporative coils and the condenser coils in the direction shown by the plurality of arrows 201. FIG. 7F is an enlarged exemplary figure of arrow 201.

Figure 7G:
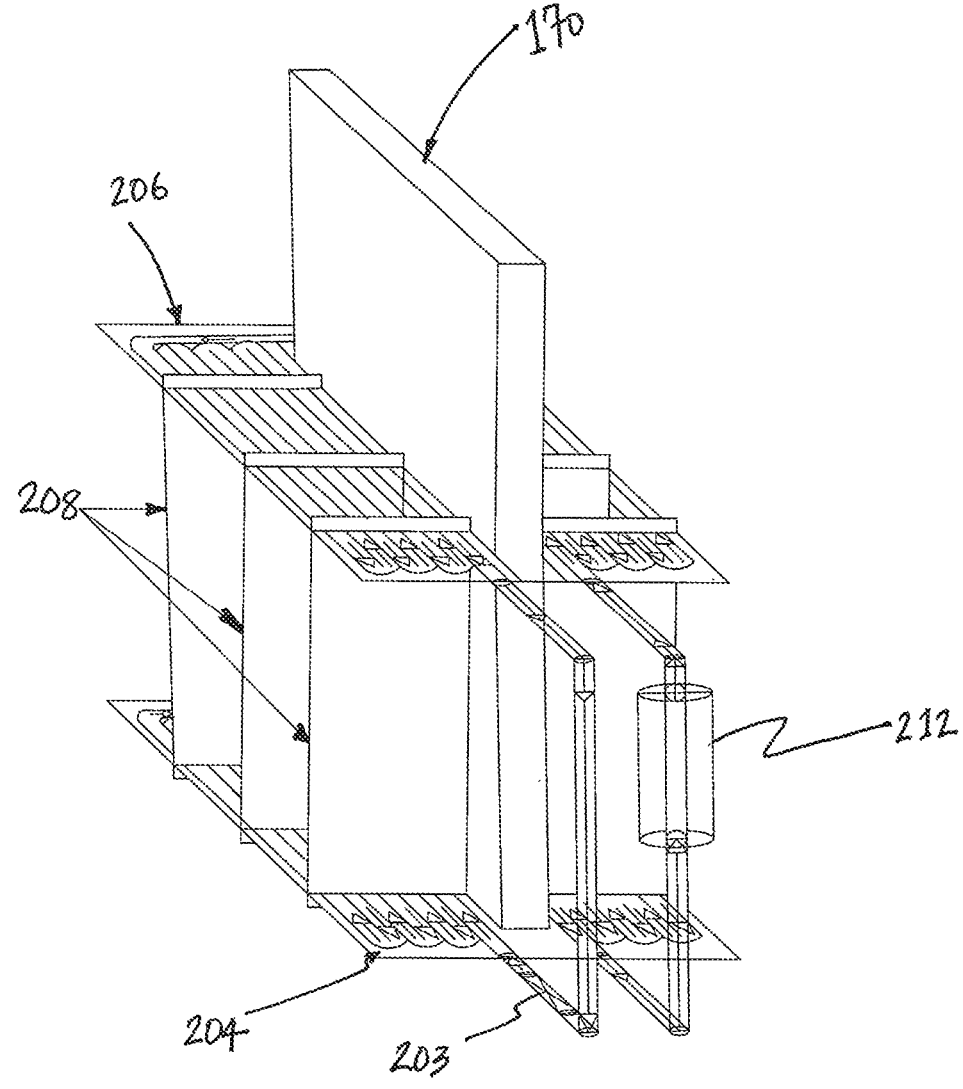
FIG. 7G is a perspective schematic view of an evaporative and condenser coils refrigeration stage 1 and stage 2.

FIG. 7G shows the perspective view of freeze pod refrigeration system 200, providing more context on the placement of the condenser coils and evaporative coils with respect to the freeze pod steam distribution system 170.

Figures 8A, 8B, 8C, 8D:
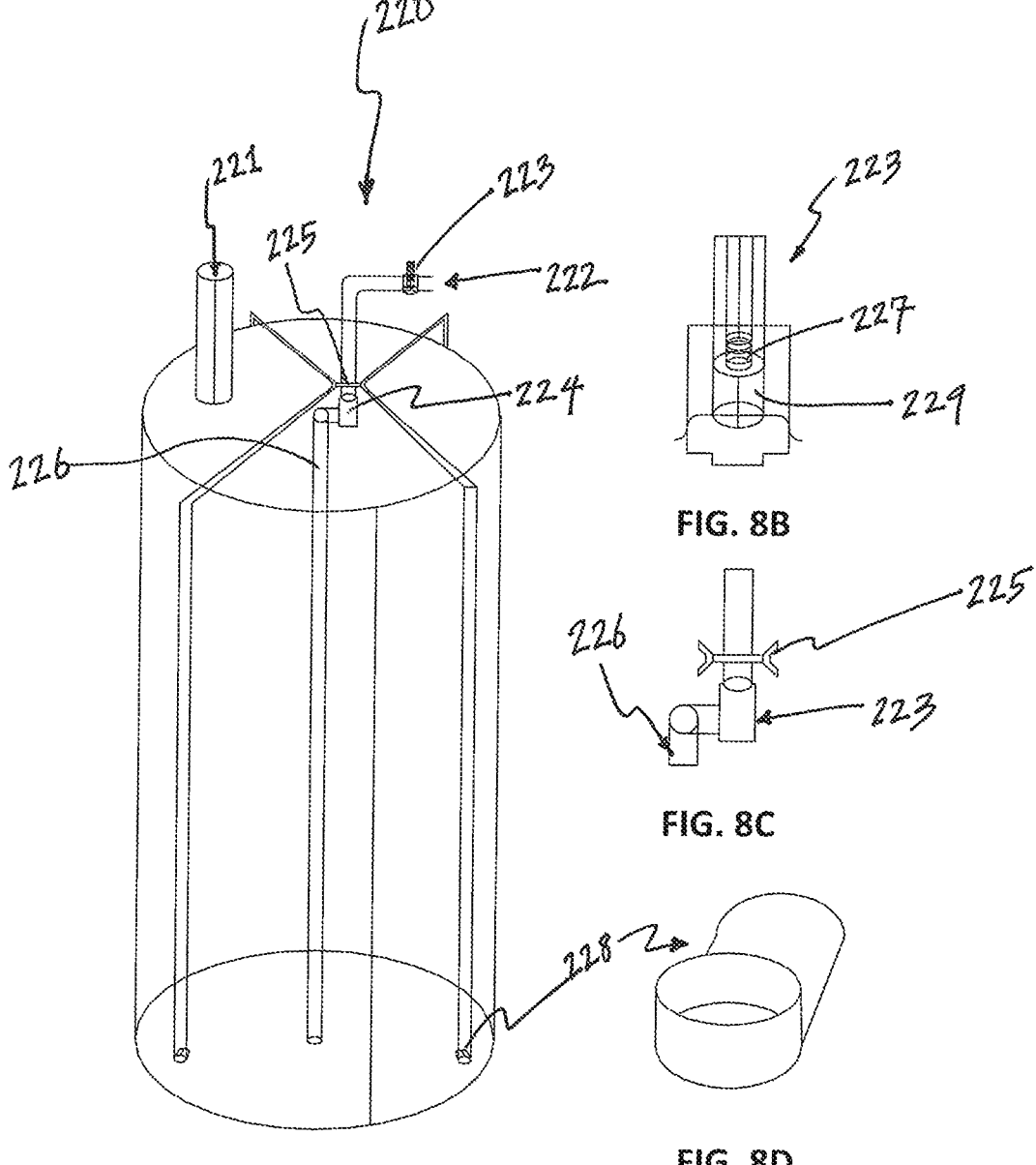
FIG. 8A is a perspective schematic view of a vat liquid dump tank.
FIG. 8B is an enlarged side schematic view of a dump tank solenoid valve.
FIG. 8C is an enlarged side schematic view of a dump tank pipe junction that interfaces with the recirculation pump and the recirculation pipe manifold.
FIG. 8D is an enlarged perspective schematic view of the vat dump tank's inlet pipe.

FIG. 8A shows the vat liquid dump tank 220 and used in the dumping process 52, which is the first process in the fractionalization step 51. The fractionalization step 51 may utilize one or multiple vat liquid dump tanks 220, which consist of includes an intake 221 for the vat liquid, an outlet 222 that connects to the dewatering screw system 230, a solenoid valve 223, a recirculation pump 224 that is connected to the recirculation pipe manifold 225, and an inlet to the sludge pump 226. Also included are a plurality of inlet pipes 228 that feed vat liquid to the recirculation pump. The solenoid valve 223 includes a control spring 227 and a flow area 229. The vat liquid is kept in constant motion in the vat dump tank 220 to prevent particulates from settling on the floor of the vat dump tank 220.

Figure 9:
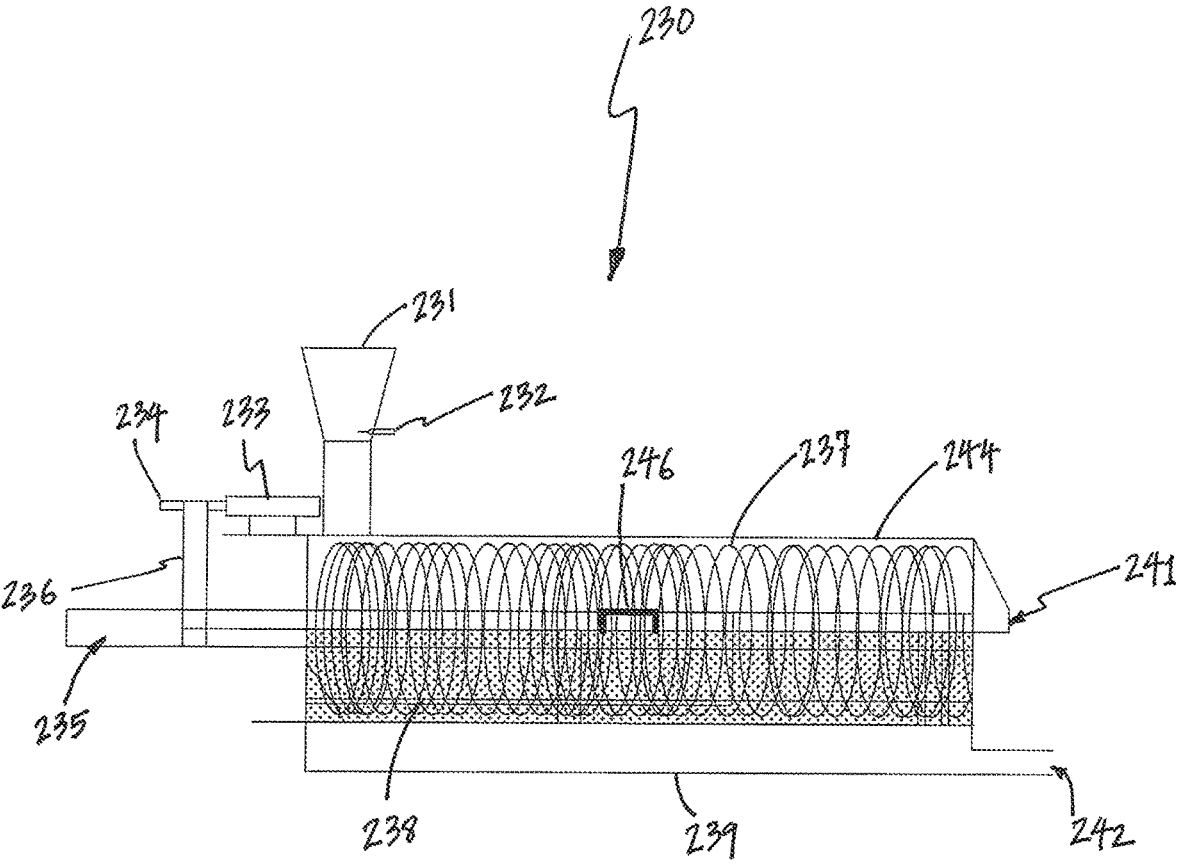
FIG. 9 is a side schematic view of a dewatering screw.

FIG. 9 shows the dewatering screw system 230 and used in the dewatering process. The dewatering screw apparatus 230 includes a hopper 231 from vat dump tank 220, a solenoid sensor 232, a dewatering screw motor 233, a dewatering screw motor shaft 234, a dewatering screw shaft 235, a drive belt 236, a dewatering screw 237, a fluid screen 238, a catch basin 239, an exit 241 that leads to the sludge dryer 250 (see FIG. 10A), an exit 242 to the distillation tower 290 (see FIG. 12A), a hardshell top 244 and a locking latch 246. The sludge is to the dewatering screw through a solenoid valve 223 (see FIG. 8A), that is connected to the hopper 231. The hopper 231 has a solenoid sensor 232 that is used to control flow of sludge into the dewatering screw system 230 by acting switch that opens and closes the solenoid valve 233, according to a prescribed setting. The dewatering screw motor 233 rotates the dewatering motor shaft 234, which is connected to the dewatering screw shaft 235 through the drive belt 236.

The dewatering screw shaft 235 is responsible for turning the dewatering screw 237, which is housed in a cylindrical tube with a hardshell top 244. The dewatering screw 237 squeezes out the water from the sludge being fed through the hopper 231. The water then passes through the fluid screen 238, which is noncorrosive, into a catch basin 239 and drained through exit 242 into a holding tank 292 (see FIG. 12A). The sludge exits from the sludge exit 241, which is tapered to squeeze out any excess water left by the dewatering screw 237.

Figures 10A, 10B, 10C:
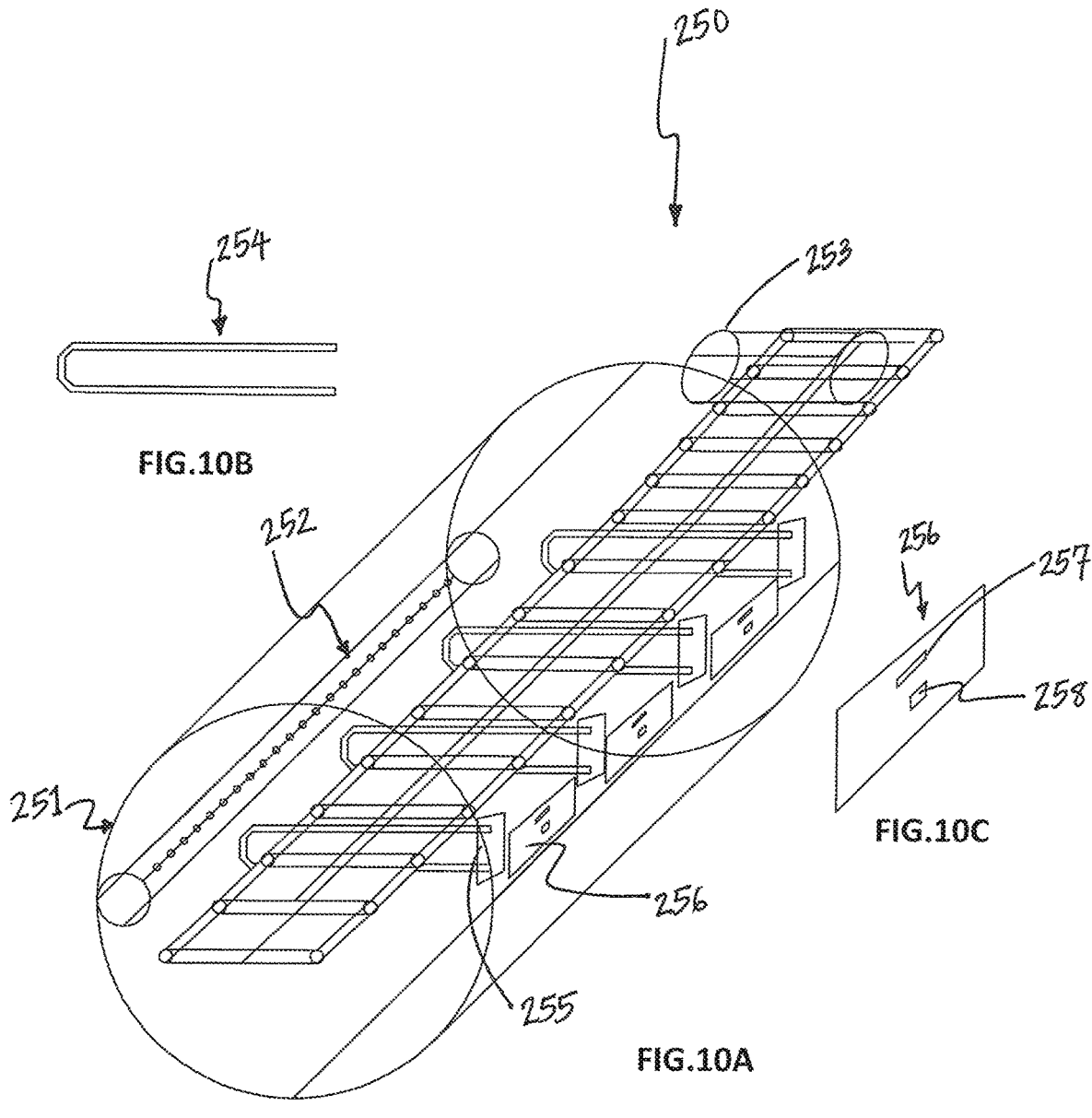
FIG. 10A is a perspective view of a sludge dryer.
FIG. 10B is an exemplary front schematic view of a single C-shaped heating element.
FIG. 10C is an exemplary perspective view of a single maintenance door.

FIG. 10A shows a sludge dryer that is used in the drying process 62. The purpose of the dryer is to dry the particulate matter that is provided by the dewatering screw system 230. The sludge dryer includes a cylindrical tube 251, a dust vacuum 252, a material flattener 253, a plurality of C-shaped heating elements 254, a plurality of element plugs 255, a plurality of maintenance doors 256 that includes a door handle 257, and a sight glass 258. Cylindrical tube 251 is the outer covering of the sludge dryer 250. Dust vacuum 252 is used to capture any dust particles created during the drying process 62. The sludge dryer 250 also has a conveyer belt with a plurality of C-shape heating elements 254 that transports the sludge received from dewatering screw system 230 (see FIG. 9) along the length of the sludge dryer 250. The plurality of C-shape heating elements 254 act as the heat source that facilitates the sludge drying process. An image of a single C-shaped heating element 254 is as shown in FIG. 1013. The C-shape heating element 254 is encapsulated the conveyor belt from above and beneath, between the conveyor belt wheels. The conveyer belt carries the dried sludge to the material flattener 253, which presses the dried sludge into a compact form.

The sludge dryer 250 also has a plurality of maintenance doors 256, which is shown in FIG. 10C. The maintenance doors 256 are equipped with door handle 257 that is used to open the maintenance doors 256 and a sight glass that is used to monitor the drying process and visually troubleshoot.

Figure 11A:
FIG. 11A is a perspective schematic view of a separation of dried particulate matter system for ferrous and non-ferrous metals.
Figure 11A:
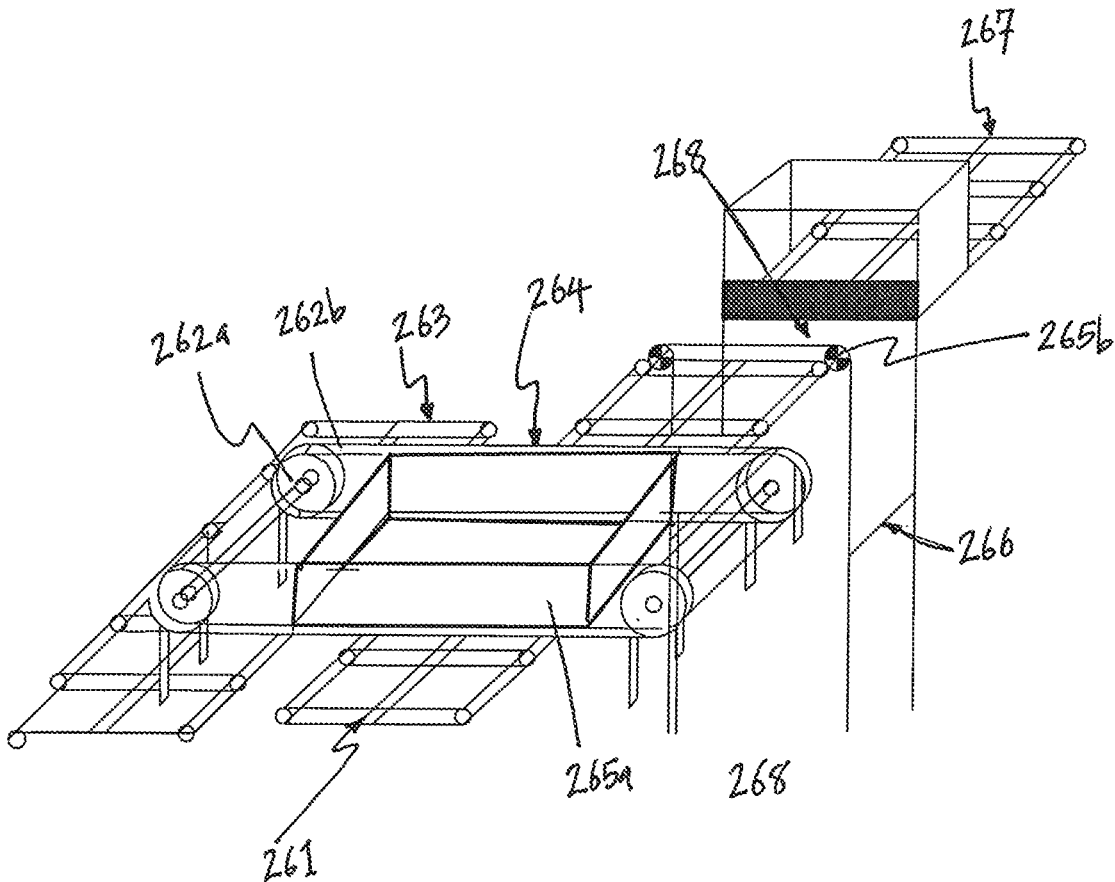

FIG. 11A shows the first separation dried particulate matter system 260, which is used in the first separation of dried particulate matter process 68 of ferrous and non-ferrous metals. The first separation of dried particulate matter system 260 includes an entrance connect from the sludge dryer 261, a plurality of rollers for ferrous metals 262a, and plurality of belts for ferrous metals 262b, an exit 263 that leads to the ferrous metal bin, a conveyer belt 264 for magnetically caught ferrous metals, a fixed magnet 265a, an alternating magnetic drum 265b, a plastics, carbon, and ash flow area 266, an exit 267 to the non-ferrous metals bin, and a plurality of plastic, carbon and ash exits 268. The dried sludge enters the first separation of dried particulate matter system 260 through entrance 261 and is then carried through the fixed magnet 265a that pulls out the ferrous metals from the dry particulate matter. The fixed magnet 265a extends slightly over ferrous metal bin exit 263. Non-ferrous metals are repelled from the dry particulate matter using an eddy current created by the alternating magnetic drum 265b. The repelled non-ferrous metals are then deposited into the non-ferrous metal bin 267. The remainder of the particulate matter is then deposited in one of the exits for plastic, carbon, and ash 268 in preparation for the second separation.

Figure 11B:
FIG. 11B is a perspective schematic view of a separation of dried particulate matter system for plastics, ash, and carbon.
Figure 11B:
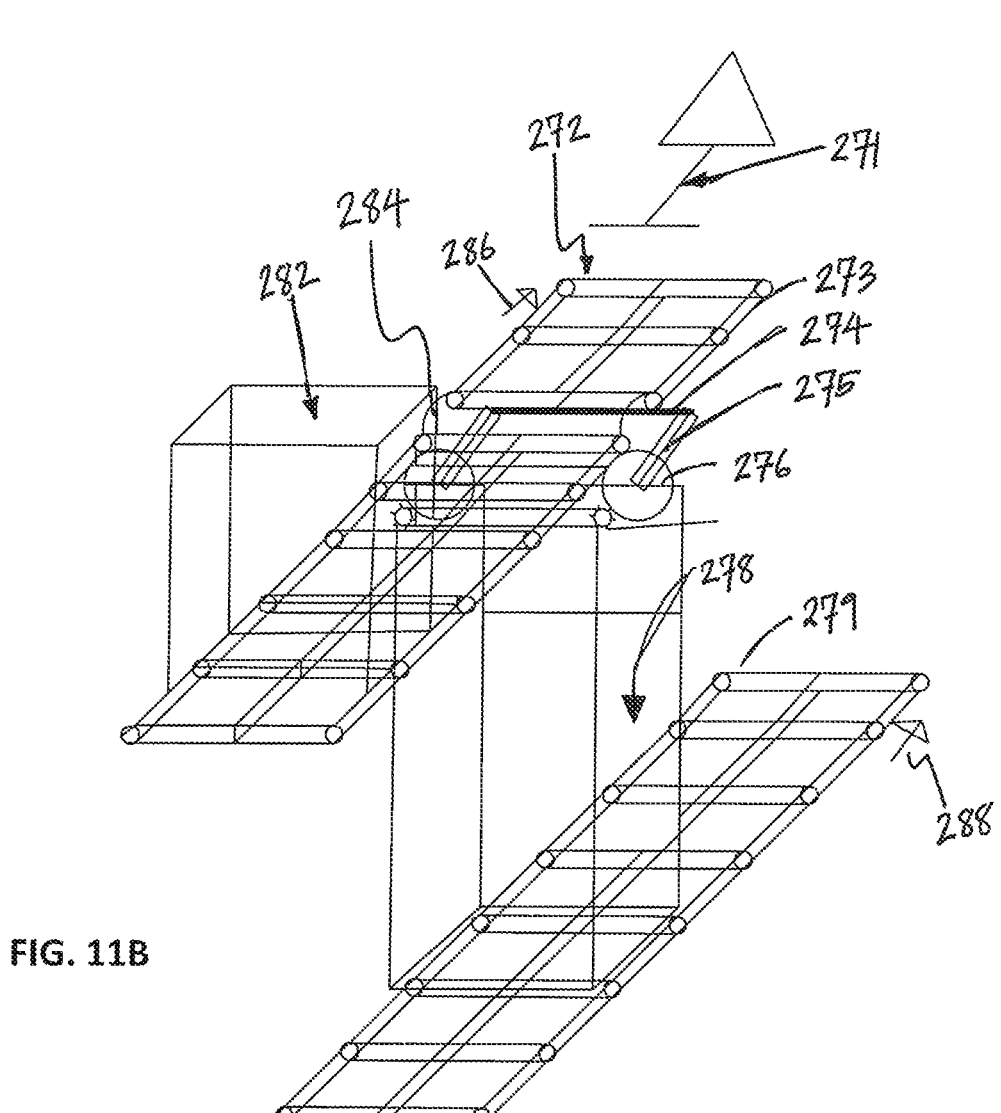

FIG. 11B shows the second separation of dried particulate matter apparatus 270 used in the second separation of dried particulate matter process for plastics, carbon, and ash. The second separation of dried particulate matter apparatus 270 comprises of a diode 271, a plastics exit 272, a plastics receiver 273, a plurality of tungsten wires 274, an electromagnetic transfer mechanism 275, a static electricity barrel 276, a barrel brush 277, a temporary magnetized material chute 278, an exit 279 for carbon and ash, an inlet 282 that is connected to the first separation of dried particulate matter separation matter chute 266 (see FIG. 11A), and a plastic repelling area 284. Also included in FIG. 11B are direction arrow 286, which shows the direction of flow for the plastics, and direction arrow 288 that shows the direction of flow for the carbon, and ash. The second separation of particulate matter takes advantage of electrostatic properties of plastic carbon and ash. After the particulate matter enters the second separation of particulate matter system through inlet 282, the particulate matter travels up the conveyer belt in the direction shown by direction arrow 286. The particulate matter, which includes plastic, ash and carbon encounter and a plurality of tungsten wires 284 that are electrostatically charged by diode 271 using the electromagnetic transfer mechanism 275 and the static electricity barrel 276. The tungsten wires 284 and the static electricity barrel 276 serve as attractors of carbon and ash, which have high temporary clinging ability to objects with an electrostatic charge. However, the electrostatic charge of the tungsten wires 284 and the static electricity barrel 276 have an adverse effect on plastics, which continue traveling up the conveyor belt in the direction of direction 286 to the plastics exit 272. The electrostatically attracted carbon and ash are sent down a temporary magnetized chute 278 and transported in the direction of direction arrow 288 to the carbon and ash exit 279.

Figures 12A, 12B:
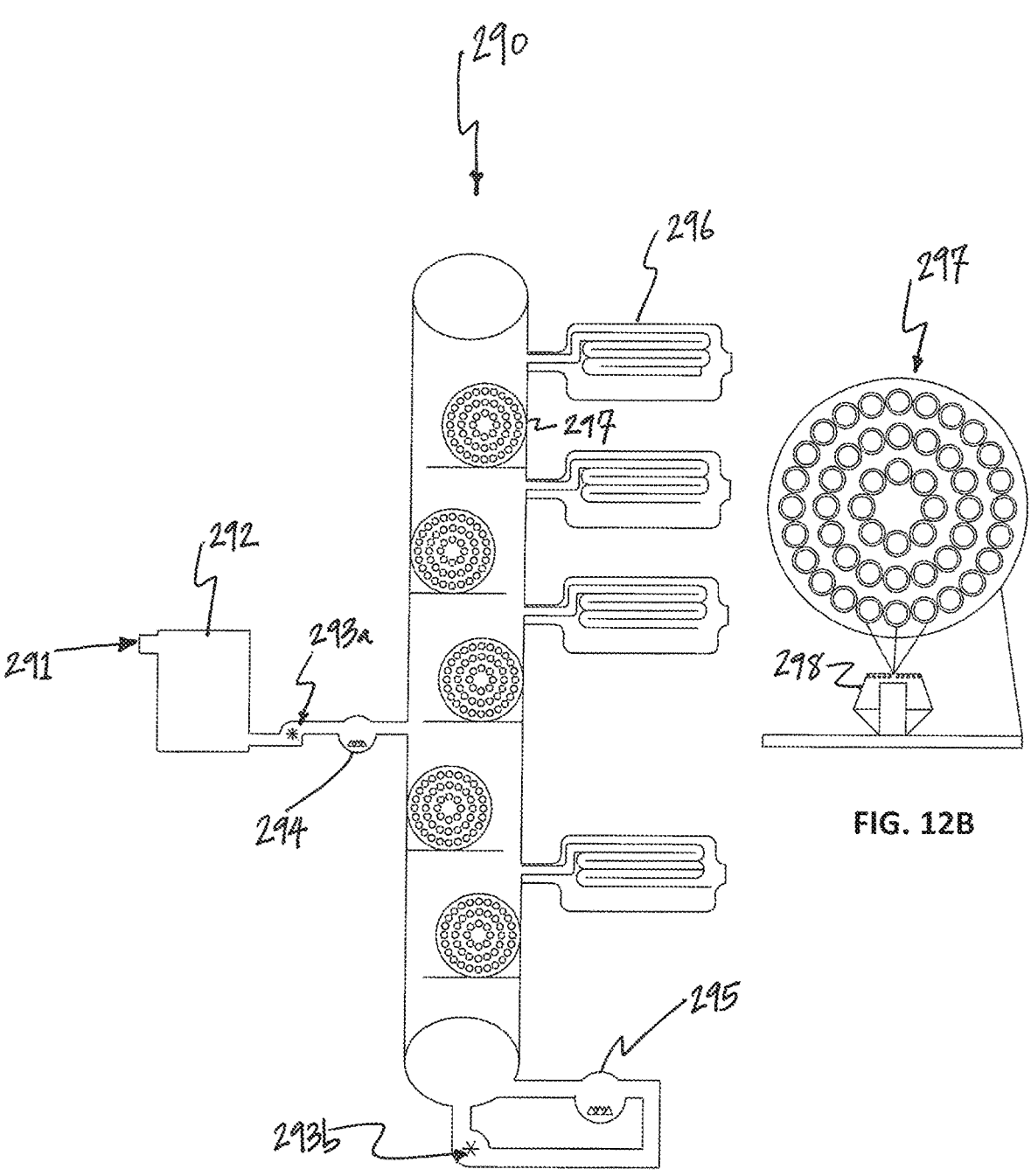
FIG. 12A is a side schematic view of a distillation tower.
FIG. 12B is an enlarged side schematic view of a sieve.

FIG. 12A shows the distillation tower 290 that is used in the distillation process 66. The distillation tower 290 includes a holding tank inlet 291 that is connected to the dewatering screw, a holding tank 292, a first pump 293a and second pump 293b, a boiler 294, a reboiler 295, a plurality of condensers 296, a plurality of sieves 297 that have bubble caps 298. FIG. 12B is an enlarged illustration of sieve 297. The water from the dewatering screw 230 (see FIG. 9) fed through the holding tank inlet 291 for storage in the holding tank 292. The liquid in the holding tank 292 is then pumped by a first pump 293a, that sits between the holding tank and the distillation tower, through boiler 294, which boils the liquid and converts the liquid's contents into vapor. The plurality of contents in the boiled liquid has a plurality of the vaporization temperatures. Therefore, for exemplary purposes, the first content in the boiled liquid may vaporize at a first vaporization temperature and rise through the distillation tower 290 until it reaches a first sieve 297. The height at which the vapor rises is dependent on the weight of the molecule of each content in the liquid. The vapor travels through the plurality of sieves 297 in a plurality of condensers 296, that vapor into a distilled liquid that is harvested.

Figure 13:
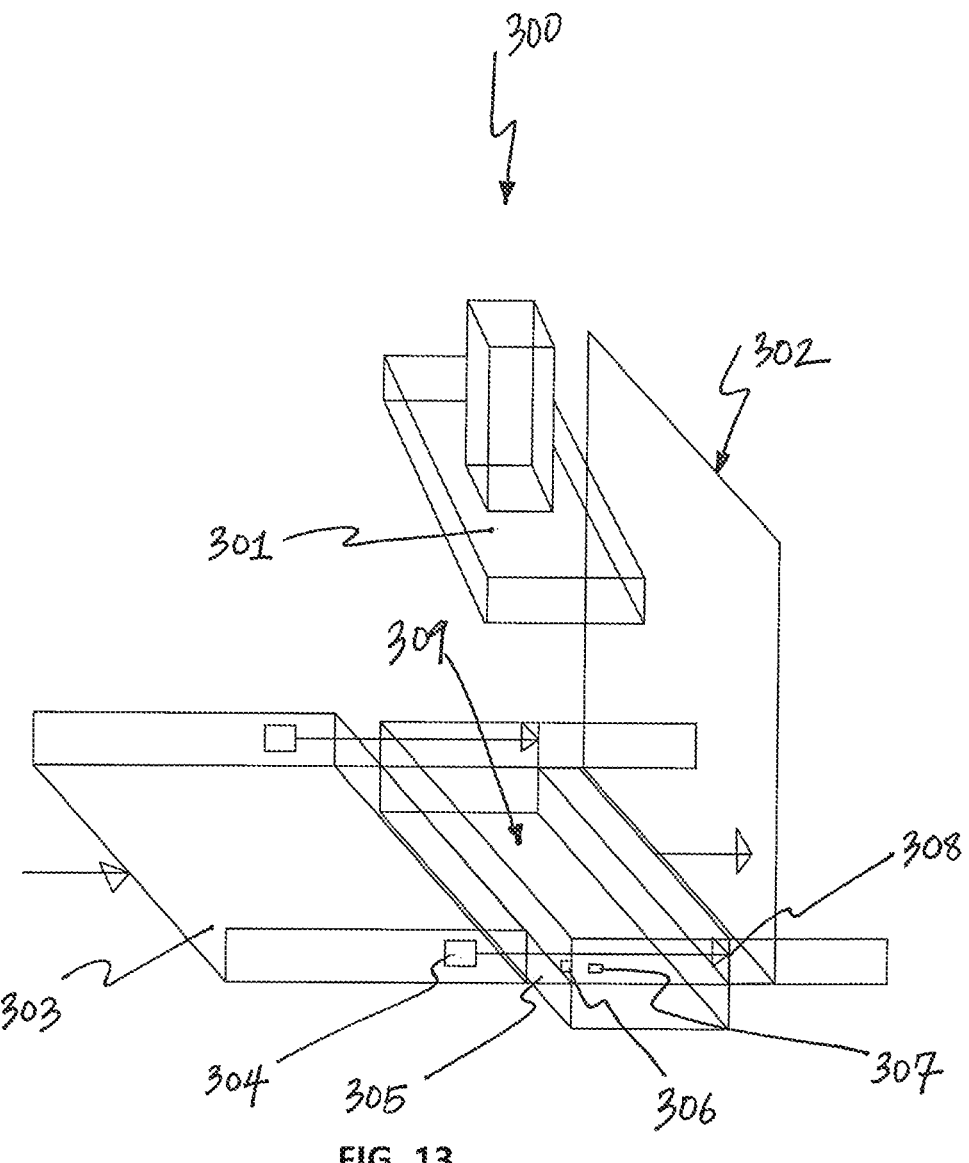
FIG. 13 is a perspective schematic view of a pulverizing system.

FIG. 13 depicts a pulverizing system 300 that is used in the pulverization process 54. The pulverizing system 300 includes a pulverize 301, an entrance 302 to the sublimation chamber, a slide 303 for slabs of dry ice, a plunger actuator 304, a positioning flap 305, a door switch 306, an eye sensor 307 for the pulverizer 301, a spring load exit flap 308, and a descending/ascending platform 309. Slabs of dry ice are fed to the pulverizing system 300 via slide 303. Attached to the slide is the plunger actuator that controls the positioning flap 305, which is parallel to the slide 303 when not actuated. The slabs of dry ice slide to the descending/ascending platform 309 past eye sensor 307, which sends a signal to the plunger actuator 304. Once the plunger actuator receives the signal from the eye sensor 307, it causes the positioning flap to rotate 90-degrees relative to the slide 303, hitting the door switch 306 that causing the ascending/descending platform 309 to lower the dry ice to the pulverizer 301. The dry ice is pulverized by the pulverizer 301 by dropping the dry ice. The ascending/descending platform then rises to its original position, triggering the sublimation chamber door 302 to open.

Figures 14A, 14B, 14C, 14D:
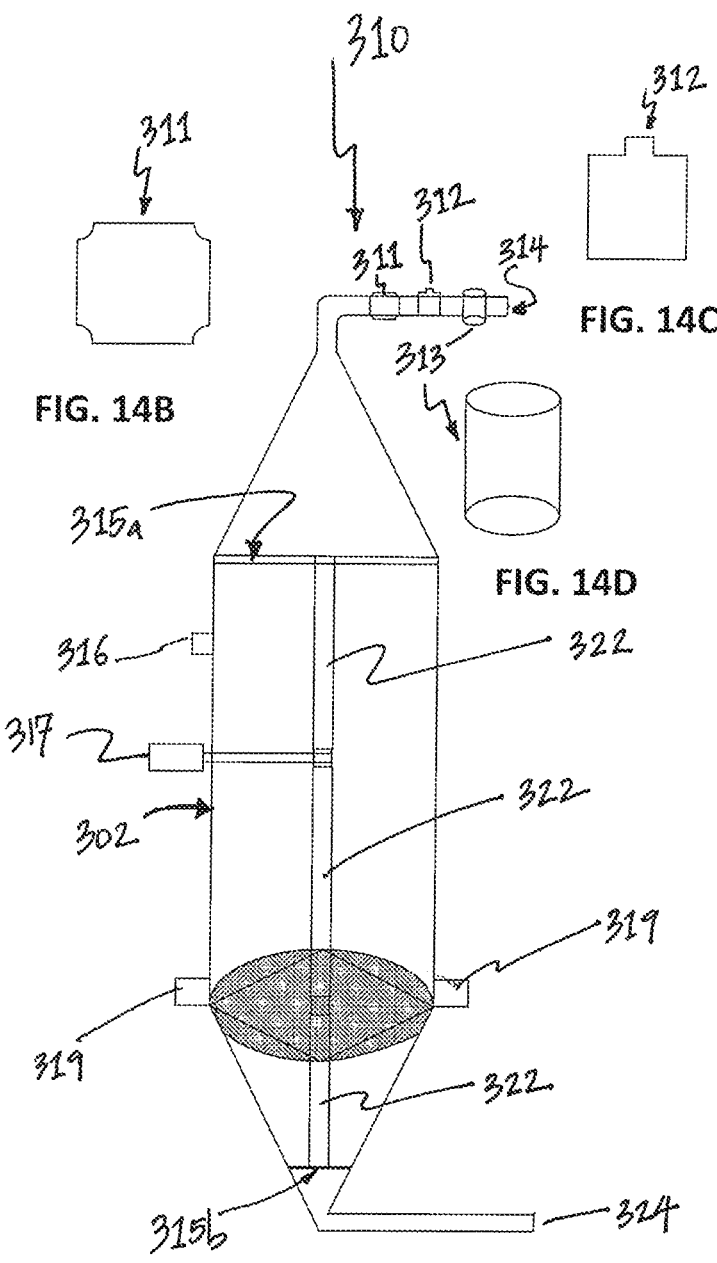
FIG. 14A is a perspective schematic view of a sublimation chamber.
FIG. 14B is an enlarged side schematic view of the filter dryer.
FIG. 14C is an enlarged side schematic view of the vacuum.
FIG. 14D is an enlarged side schematic view of the compressor.

FIG. 14A shows sublimation chamber 310 that is used in the sublimation process 57. The sublimation chamber 310 includes a filter 311, a vacuum 312, a compressor 313, an exit 314 that leads to the carbon dioxide storage tank, a top sleeve support 315a, a bottom sleeve support 315b, a thermostat 316, a gear box 317, the pulverizer's entrance 302 into the sublimation chamber, a grate 318, a plurality of heater fans 319, a plurality of sleeves 322, and an exit 324 that leads to mercury storage tank. FIG. 14B is an enlarged illustration of the filter drier 311, FIG. 14C is an enlarged illustration of the vacuum 312, and FIG. 14D is an enlarged illustration of the compressor 313. The sublimation chamber operates at around 70 degrees Fahrenheit to provide any water molecules that were in the dry ice with ample heat to dehydrate. The temperature of the sublimation chamber is monitored by a thermostat 316, which runs using a force air heating system that controls the plurality of heating fans 319.

As mercury sublimates, it drops down the grate 318 and through the mercury exit 324 to a storage tank. The carbon dioxide from the dry ice travels up the sublimation chamber 310 through the assistance of the vacuum 312. Any remaining water molecules are then captured by the filter drier 311, ensuring only carbon dioxide is fed to the compressor 313. Compressor 313 pressurizes the carbon dioxide to create a natural refrigerant, which is sent to a storage tank via carbon dioxide exit 314.

The industrial air pollution removal system 10 and method of the present disclosure has several advantages. The first advantage is the precautionary measures that the industrial pollution removal system 10 has to prevent leaking of emissions 14 to the environment 11.

The second advantage is the universal utility of the industrial air pollution removal system 10 that can be customized for use in a variety of different settings. For instance, the industrial air pollution removal system can be used in coal driven electrical generation plants, oil refineries, and manufacturing facilities.

The third advantage the way the industrial air pollution removal system 10 creates an orchestration of widely accepted well established methods like the distillation process 290 (see FIG. 12A), and the particulate separation processes, namely the first separation of particulate matter (see FIG. 11A) and the second separation of particulate matter (see FIG. 11B) into a novel system way The fourth advantage of the industrial air pollution removal system 10 is the reduction of emissions 14 into reusable final products. This reduction also effectively leads to the reduction of carbon dioxide in the environment 11, which is a factor in global warming.

While the forgoing written description of the process enables one of ordinary skill to make and use what is presently considered to be the best mode thereof, those of ordinary skill in the art will understand and appreciate the existence of variations, combinations, and equivalents of the specific embodiment, method, and examples herein. The process should, therefore, not be limited by the above-described embodiment, method, and examples, but by all embodiments and methods within the scope and spirit of the process.

What is claimed:

1. An industrial air pollution removal method comprising:
 receiving emissions from an emission producing plant;
 determining a molecular composition of the emissions from the emission producing plant;

combusting the emissions with known molecular composition in a burning chamber to produce combusted emissions;

sending the combusted emissions to a vat tank containing water to form a vat liquid and gaseous content, wherein the vat liquid includes water-soluble content and particulates from the combusted emissions that are captured in the water, and the gaseous content includes water-insoluble content from the combusted emissions and steam;

separating the gaseous content from the vat liquid;

freezing the gaseous content including the water-insoluble content of the combusted emissions to create a mix of water-insoluble content and frozen emissions;

separating the water-insoluble content from the frozen emissions;

separating the particulates from the water-soluble content in the vat liquid to form a remaining vat liquid, wherein the particulates are comprised of ferrous metals, non-ferrous metals, carbon and ash; and distilling the remaining vat liquid to separate the water from the water-soluble contents.

2. The method of claim 1, where the presence of mercury in the emissions is detected.

3. The method of claim 1, where combusting the emissions comprises ramping up a temperature of the burning chamber to attain a set of flash point temperatures that ensure the complete combustion of a set of volatile organic compounds, a set of semi-volatile organic compounds as well as dioxides, monoxides and organometallic compounds present in the emissions.

4. The method of claim 3, where the flash point temperatures are attained by increasing the temperature of the burning chamber from a starting temperature, by 100 degrees Fahrenheit, to a final temperature of 2000 degrees Fahrenheit.

5. The method of claim 2, where the steam produced in the vat tank while capturing the water-soluble content and the particulates is used in:

generating electricity; or heating and cooling applications.

6. The method of claim 2, where separating the frozen emissions from the water-insoluble content includes separating mercury from carbon dioxide.

7. The method of claim 6, where separating the frozen emissions from the water-insoluble content involves a pulverizing process of a frozen slab of dry ice that contains mercury and carbon dioxide.

8. The method of claim 7, where separating the frozen emissions from the water-insoluble content involves a sublimation step in a sublimations chamber.

9. The method of claim 1, where the water-soluble content and the particulates in the vat tank are used in a fractionalization step.

10. The method of claim 9, where the particulates are fractionalized into a first batch of metallic particulates and a second batch of non-metallic particulates.

11. The method of claim 10, where the first batch of metallic particulates are further fractionalized into a third batch of ferrous metals and a fourth batch of non-ferrous metals.

12. The industrial air pollution removal system of claim 10, where the second batch of non-metallic particulates includes plastic, carbon, and ash.

13. A method of removing industrial air pollution produced by an emission producing plant, comprising:

receiving emissions having an unknown molecular composition from an emission producing plant;

determining a molecular composition of the emissions from the emission producing plant;

combusting the emissions with known molecular composition in a burning chamber to produce combusted emissions;

sending the combusted emissions to a vat tank containing water to form a vat liquid and gaseous content, wherein the vat liquid includes water-soluble content and particulates from the combusted emissions that are captured in the water, and the gaseous content includes water-insoluble content from the combusted emissions and steam;

separating the gaseous content from the vat liquid;

freezing the gaseous content including the water-insoluble content of the combusted emissions to create a mix of water-insoluble content and frozen emissions;

separating the water insoluble content from the frozen emissions; and separating the particulates from the water-soluble content in the vat liquid to form a remaining vat liquid.

14. The method of claim 13, wherein determining the molecular composition of the emissions includes detecting mercury.

15. The method of claim 14, where a burning phase starts in the burning chamber at a starting temperature and is ramped up by 100 degrees Fahrenheit to achieve a set of flash point temperatures until it reaches a final temperature of 2000 degrees Fahrenheit to combust a set of volatile organic compounds and a set of semi-volatile organic compounds and/or dioxanes, monoxides or organometallic compounds present in the emissions from the emission producing power plant.

16. The method of claim 15, where the set of water-insoluble content includes carbon dioxide and mercury, and the particulates include ferrous metals, non-ferrous metals, plastics, and ash.

17. The method of claim 13, where separating the water-soluble contents from the particulates includes:

separating using a dewatering screw to form a liquid and a sludge;

distilling the liquid in a distillation tower; and drying the sludge, which is the mixture formed of remaining liquid and particulates by the dewatering screw, with a sludge dryer to form a dried particulate matter.

18. The method of claim 17, further comprising separating the dried particulate matter by:

sequestering and harvesting carbon dioxide;

harvesting ferrous metals;

harvesting non-ferrous metals;

harvesting plastics; and harvesting carbon and ash.

* * * * *